United States Patent
Choi et al.

(10) Patent No.: US 8,320,243 B2
(45) Date of Patent: Nov. 27, 2012

(54) METHOD OF CLASSIFYING DATA AND TRANSMITTING DATA IN A PLC NETWORK AND APPARATUS THEREFOR

(75) Inventors: Jun-hae Choi, Seongnam-si (KR); In-hwan Kim, Suwon-si (KR); Seung-gi Chang, Seoul (KR); Joon-hee Lee, Gunpo-si (KR); Ju-han Lee, Suwon-si (KR); Ho-jeong You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 641 days.

(21) Appl. No.: 11/599,262

(22) Filed: Nov. 15, 2006

(65) Prior Publication Data

US 2007/0195762 A1 Aug. 23, 2007

Related U.S. Application Data

(60) Provisional application No. 60/775,800, filed on Feb. 23, 2006.

(30) Foreign Application Priority Data

Mar. 25, 2006 (KR) ........................ 10-2006-0027204

(51) Int. Cl.
*G01R 31/08* (2006.01)
*H04L 12/28* (2006.01)
(52) U.S. Cl. ..................... 370/230; 370/252; 370/389
(58) Field of Classification Search .................. 370/252, 370/230
See application file for complete search history.

(56) References Cited

U.S. PATENT DOCUMENTS

| | | | |
|---|---|---|---|
| 6,105,029 A * | 8/2000 | Maddalozzo et al. | 707/10 |
| 6,778,509 B1 * | 8/2004 | Ravishankar et al. | 370/322 |
| 6,874,090 B2 * | 3/2005 | See et al. | 726/13 |
| 2002/0089952 A1 * | 7/2002 | Cao et al. | 370/335 |
| 2002/0120749 A1 * | 8/2002 | Widegren et al. | 709/227 |
| 2004/0095906 A1 * | 5/2004 | Rajkotia | 370/332 |
| 2004/0114608 A1 * | 6/2004 | Rao et al. | 370/396 |
| 2004/0213150 A1 * | 10/2004 | Krause et al. | 370/229 |
| 2005/0047379 A1 * | 3/2005 | Boyden et al. | 370/338 |
| 2005/0180430 A1 * | 8/2005 | Kawaguchi et al. | 370/395.41 |
| 2006/0146863 A1 * | 7/2006 | Spinar et al. | 370/449 |
| 2007/0053352 A1 * | 3/2007 | Corcoran | 370/389 |
| 2007/0165668 A1 * | 7/2007 | Liu | 370/466 |
| 2009/0252219 A1 * | 10/2009 | Chen et al. | 375/240.02 |
| 2010/0014423 A1 * | 1/2010 | Furuskar et al. | 370/235 |

FOREIGN PATENT DOCUMENTS

KR 1998-75850 11/1998

OTHER PUBLICATIONS

Korean Office Action dated Apr. 24, 2007 issued in KR 2006-27204.

* cited by examiner

*Primary Examiner* — John Blanton
(74) *Attorney, Agent, or Firm* — Stanzione & Kim, LLP

(57) ABSTRACT

A method of transmitting data more effectively, and more particularly, a method of classifying service traffic, transmitting data according to the classifications of the service traffic, and performing a contention free slot (CFS) allocation in order to transmit data in a power line communication (PLC) network, and an apparatus to do the same. The data transmission method includes determining transmission priority of data according to service traffic characteristics, and transmitting data according to the determined transmission priority, thereby providing differentiated quality of service (QoS) according to service traffic characteristics.

19 Claims, 7 Drawing Sheets

FIG. 3A

DATA PACKET | FIRST PRIORITY INFORMATION

FIG. 3B

MAC HEADER | SECOND PRIORITY INFORMATION

MAPPING

FIG. 3C

MAC HEADER | SECOND PRIORITY INFORMATION | DATA FRAME BODY | BPAD | FCS

DATA FRAME

COMMAND FRAME

METHOD OF CLASSIFYING DATA AND TRANSMITTING DATA IN A PLC NETWORK AND APPARATUS THEREFOR

CROSS-REFERENCE TO RELATED APPLICATIONS

This application claims priority under 35 U.S.C. 119 §(a) from U.S. Patent Application No. 60/775,800, filed on Feb. 23, 2006, in the USPTO, Korean Patent Application No. 10-2006-0027204, filed on Mar. 25, 2006, in the Korean Intellectual Property Office, the disclosures of which are incorporated herein in their entireties by reference.

BACKGROUND OF THE INVENTION

1. Field of the Invention

The present general inventive concept relates to a method of transmitting data more effectively and an apparatus to do the same, and more particularly, to a method of classifying service traffic, transmitting data according to the classifications of the service traffic, and allocating channels to transmit data in a power line communication (PLC) network, and an apparatus to do the same.

2. Description of the Related Art

A power line communication (PLC) network provides a variety of service traffic such as a signaling service, a voice over Internet protocol (VoIP) service, a video conferencing service, an audio-video (AV) streaming service, an electronic commerce service, a web browsing service, a Telnet service, a default data service, an e-mail service, a download service, etc. Each different type of service traffic has different characteristics and different levels of importance based on those characteristics. For example, whether to provide a service in real-time is the most important service traffic characteristic in the VoIP service or in the video conferencing service. However, whether to provide service in real-time is a less important service traffic characteristic in the default data service or the e-mail service than in the VoIP service or the video conferencing service.

Error sensitivity of service traffic is the most important service traffic characteristic in the electronic commerce service or web-browsing service, whereas it is a relatively less important service traffic characteristic in the AV streaming service.

Allowable delay of service traffic is the most important service traffic characteristic in the VoIP service or in the electronic commerce service, whereas it is a relatively less important service traffic characteristic in the Telnet service.

Each of the service traffic characteristics can have relative priority based on their importance. For example, whether to provide service in real-time is considered prior to the error sensitivity of service traffic. In detail, a service, whose most important service traffic characteristic is whether to provide a service in real-time, is provided prior to a service having the error sensitivity of service traffic as the most important service traffic characteristic. Accordingly, data of a service whose most important service traffic characteristic is whether to provide a service in real-time, is transmitted or allocated by a channel prior to data of a service having as a less important service traffic characteristic, whether to provide service in real-time. When various types of data are transmitted via a limited channel bandwidth, each type of data is sequentially transmitted after allocating a channel bandwidth to each type of data.

However, if the data is transmitted based only on a buffer input order without a specific standard, since differentiated quality of service (QoS) is not provided according to the service traffic characteristics, the data cannot be effectively transmitted. For example, if the VoIP service or the video conferencing service having whether to provide data in real-time as the important service traffic characteristic is not prior to the e-mail service or the download service in the transmission of data and the allocation of channels, since the VoIP service or the video conferencing service is not prior to the e-mail service or the download service in a processing order or the buffer input order, it is impossible to provide the differentiated QoS satisfying each of the service characteristics.

Conventionally, attempts to determine data transmission priority have been made using a virtual local area network (VLAN) tag user priority information field defined in the IEEE 802.3P/Q, a differentiated services code point (DSCP) field that is QoS information used in a DiffServ per-hop forwarding behavior (DiffServ PHB) service, or a DLNAQO-S_UP field that is QoS information provided by the digital living network association guidelines. However, since these attempts do not classify priority information according to the service traffic characteristics and do not divide priorities into sub-priorities, they cannot properly reflect the service traffic characteristics. In detail, since priority for the transmission of data or allocation of channels is not determined based on the service traffic characteristics, it is impossible to provide differentiated QoS according to types of services, and thus it is impossible to more effectively transmit data. Therefore, it is necessary to classify service traffics and sequentially transmit data based on the classified priority or allocate data transmission channels in order to provide the differentiated QoS according to service characteristics in a PLC network.

SUMMARY OF THE INVENTION

The present general inventive concept provides a data transmission method and apparatus in a power line communication (PLC) network that provide differentiated quality of service (QoS) according to service traffic characteristics by more effectively designating a data transmission priority and a channel allocation priority to transmit data.

Additional aspects and advantages and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a data transmission method including determining a transmission priority of data according to service traffic characteristics, and transmitting data according to the determined transmission priority. The service traffic characteristics may include at least one of whether to provide data in real-time, error sensitivity, and allowable delay.

The foregoing and/or other aspects and utilities of the present general inventive concept are also achieved by providing a data transmission method including inputting data including first transmission priority information, mapping the first transmission priority information to second transmission priority information according to service traffic characteristics, and transmitting data based on the second transmission priority information. The service traffic characteristics may include at least one of whether to provide data in real-time, error sensitivity, and allowable delay.

The foregoing and/or other aspects and utilities of the present general inventive concept are also achieved by providing a data transmission apparatus including a priority information mapping unit to receive data including first transmission priority information, and to map the first transmission priority information to second transmission priority information according to service traffic characteristics, and a data transmission unit to transmit the data based on the second transmission priority information. The service traffic characteristics may include at least one of whether to provide data in real-time, error sensitivity, and allowable delay.

The foregoing and/or other aspects and utilities of the present general inventive concept are also achieved by providing a channel allocation method including transmitting a channel allocation request including channel allocation priority information according to service traffic characteristics, and allocating channels based on the channel allocation priority information. The service traffic characteristics may include at least one of whether to provide data in real-time, error sensitivity, and allowable delay.

The foregoing and/or other aspects and utilities of the present general inventive concept are also achieved by providing a channel allocation request apparatus including a channel allocation request transmission unit to transmit a channel allocation request, including channel allocation priority information according to service traffic characteristics. The service traffic characteristics may include at least one of whether to provide data in real-time, error sensitivity, and allowable delay.

The foregoing and/or other aspects and utilities of the present general inventive concept are also achieved by providing a channel allocation apparatus including a channel allocation unit to allocate channels based on channel allocation priority information according to service traffic characteristics. The service traffic characteristics may include at least one of whether to provide data in real-time, error sensitivity, and allowable delay.

The foregoing and/or other aspects and utilities of the present general inventive concept are also achieved by providing a computer readable recording medium having embodied thereon a computer program to execute a data transmission method and a channel allocation method.

The foregoing and/or other aspects and utilities of the present general inventive concept are also achieved by providing an apparatus to request a channel allocation using priority determined according to service traffic characteristics, the apparatus including a priority information recognition/combination unit to receive data, to recognize priority information included in the data, and to attach power line communication (PLC) priority information generated based on the service traffic characteristics to the data if the priority information is not included in the data or if the priority information other than the PLC priority information is included in the data, and a command frame generation unit to generate a channel allocation request command frame and to transmit the channel allocation request command frame to a coordinator.

The foregoing and/or other aspects and utilities of the present general inventive concept are also achieved by providing an apparatus to sequentially transmit data based on a transmission priority determined according to service traffic characteristics in a power line communication PLC network, including a mapping unit to map a priority information field of a data packet to a PLC priority information field, a priority information combination unit to attach the mapped PLC priority information field to a frame header, a data frame generation unit to attach the frame header and other fields to a data frame body to generate a data frame, and a data frame transmission unit to transmit the generated data frame.

The generated data frame may be stored in a data frame buffer of the data frame transmission unit.

The transmission priority of the generated data frame may be determined based on the PLC priority information field prior to transmitting the generated data frame to a lower layer based on the transmission priority.

The mapping may occur when the data packet is input to the apparatus from an upper layer to a media access control (MAC) layer.

The foregoing and/or other aspects and utilities of the present general inventive concept are also achieved by providing a method of sequentially transmitting data based on a transmission priority determined according to service traffic characteristics in a power line communication PLC network, including inputting a data packet, mapping a priority information field of a data packet to a PLC priority information field, attaching the mapped PLC priority information field to a frame header, generating a data frame by attaching the frame header and other fields to a data frame body, and transmitting the generated data frame.

The generated data frame may be stored in order to determine the transmission priority of the generated data frame based on the PLC priority information field.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 3A through 3C are layout diagrams illustrating a format in which information on a transmission priority determined according to the service traffic characteristics is attached to data;

DETAILED DESCRIPTION OF THE PREFERRED EMBODIMENTS

Figure 1:
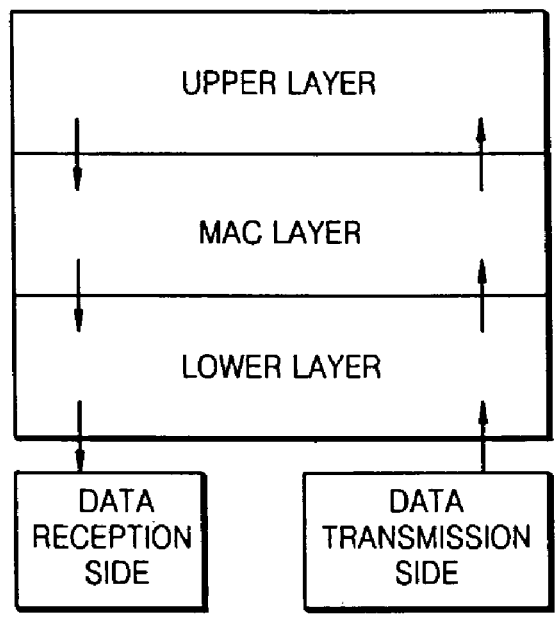
FIG. 1 is layout diagram illustrating a path along which data is transmitted through several layers in a PLC network.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Data is transmitted through several layers in a power line communication (PLC) network. FIG. 1 is layout diagram illustrating a path along which data is transmitted through several layers in a PLC network.

Referring to FIG. 1, a data transmission side transmits the data through lower layers, to a media access control (MAC) layer, and then to upper layers. Then the data is transmitted back down from the upper layers, to the MAC layer, to the lower layer, and then to a data reception side.

Figure 2:
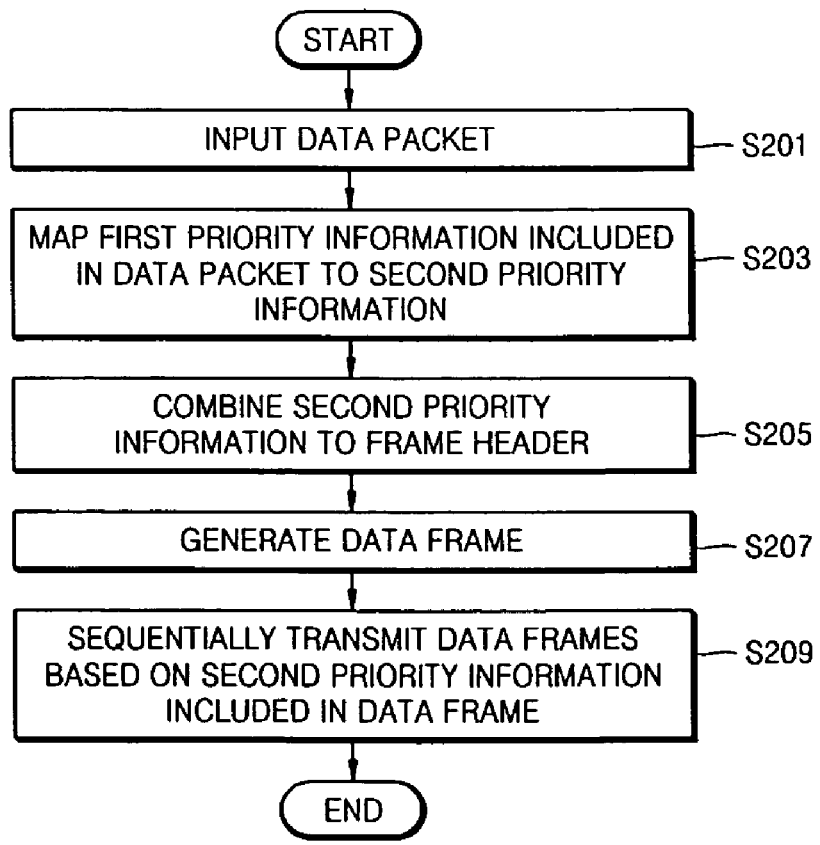
FIG. 2 is a flowchart illustrating a method of sequentially transmitting data based on transmission priority determined according to service traffic characteristics.
Figure 4:
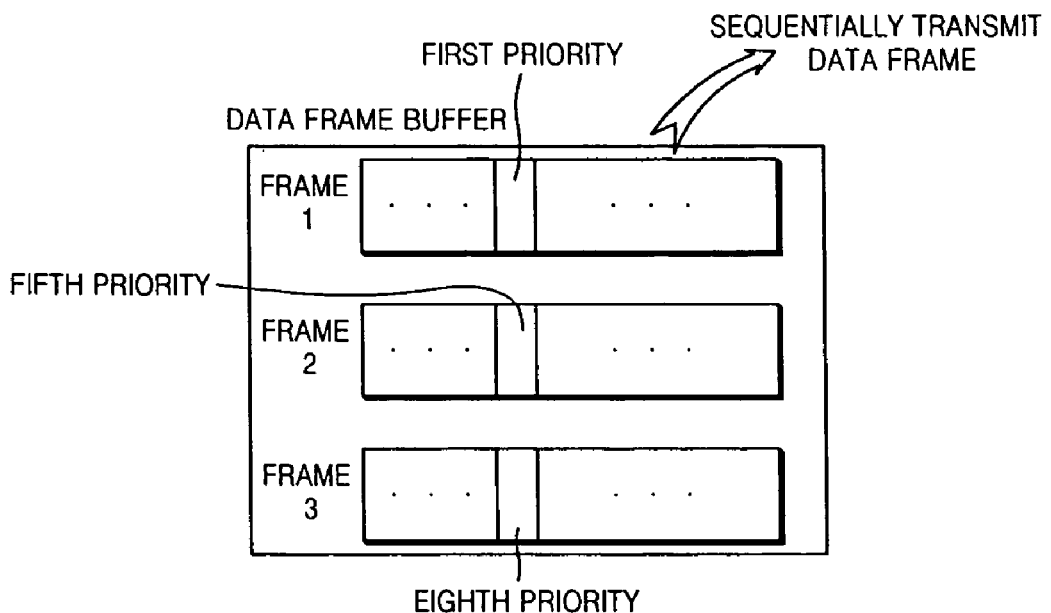
FIG. 4 is a layout diagram illustrating a format in which data frames of a buffer are sequentially transmitted based on a transmission priority determined according to service traffic characteristics.

FIG. 2 is a flowchart illustrating a method of sequentially transmitting data based on transmission priority determined according to service traffic characteristics. FIGS. 3A through 3C are layout diagrams illustrating the format in which information on the transmission priority determined according to the service traffic characteristics is attached to data. FIG. 4 is a layout diagram illustrating the format in which data frames of a buffer are sequentially transmitted based on the transmission priority determined according to the service traffic characteristics.

Referring to FIG. 2, if a data packet is input from the upper layer to the MAC layer (Operation S201), first priority information included in the data packet is mapped to PLC priority information (second priority information) determined according to service traffic characteristics of the data packet (Operation S203). The first priority information may not be included in the data packet when required. In this case, a priority is provided to the data packet according to the service traffic characteristics of the data packet, and the PLC priority information corresponding with the priority is mapped. A field of the mapped PLC priority information is combined to a frame header (a MAC header) (Operation S205), a data frame body, a padding field, a cyclic redundancy check (CRC) field, etc., are attached to the frame header, and data frames are generated (Operation S207). The data frames are sequentially transmitted based on the PLC priority information (Operation S209).

A mapping table obtained by mapping to priority information included in the data packet the PLC priority information according to the priority is illustrated in Table 1.

TABLE 1

| Priority Nos. | PLC Priority Information Fields | VLAN Tag User Priority Fields | DSCP Fields | DLNAQOS_UP Fields |
|---|---|---|---|---|
| Priority 1 | 0xE | 7 | EF | DLNAQOS_3 |
| Priority 2 | 0xD | — | AF41 | — |

TABLE 1-continued

| Priority Nos. | PLC Priority Information Fields | VLAN Tag User Priority Fields | DSCP Fields | DLNAQOS_UP Fields |
|---|---|---|---|---|
| Priority 3 | 0xC | — | AF42 | — |
| Priority 4 | 0xA | 5 | AF42 | DLNAQOS_2 |
| Priority 5 | 0x9 | — | AF42 | — |
| Priority 6 | 0x8 | — | AF42 | — |
| Priority 7 | 0x6 | — | AF31 | — |
| Priority 8 | 0x5 | — | AF21 | — |
| Priority 9 | 0x4 | — | AF11 | — |
| Priority 10 | 0x2 | 0 | AF11 | DLNAQOS_1 |
| Priority 11 | 0x1 | 1 | BE | DLNAQOS_0 |
| Priority 12 | 0x0 | — | AF11 | — |

Referring to Table 1, PLC priority information of "0xE" is mapped to the first priority. PLC priority information of "0xD" is mapped to the second priority. PLC priority information of "0xC" is mapped to the third priority. PLC priority information of "0xA" is mapped to the fourth priority. PLC priority information of "0x9" is mapped to the fifth priority. PLC priority information of "0x8" is mapped to the sixth priority. PLC priority information of "0x6" is mapped to the seventh priority. PLC priority information of "0x5" is mapped to the eighth priority. PLC priority information of "0x4" is mapped to the ninth priority. PLC priority information of "0x2" is mapped to the tenth priority. PLC priority information of "0x1" is mapped to the eleventh priority. PLC priority information of "0x0" is mapped to the twelfth priority. Priority information fields included in the data packets are virtual local area network (VLAN) tag user priority information fields, differentiated services code point (DSCP) fields that are quality of service (QoS) information used in a DiffServ per-hop forwarding behavior (DiffServ PHB) service, DLNAQOS_UP fields that are QoS information provided by the digital living network association guidelines, etc. The priority information fields are divided into first through twelfth fields according to the service traffic characteristics and mapped to the PLC priority information. Therefore, services are sub-classified more than QoS levels of services provided by the upper layer to determine priorities, thereby providing sub-differentiated QoS.

A method of determining service priorities according to the service traffic characteristics is illustrated in Table 2. Table 2 includes "real-time data providing," "error sensitivity," and "allowable delay," as the service traffic characteristics used to determine service priority, but other characteristics relating to service traffic can be used. Although the service priorities are classified into twelve service priorities in Table 2, they can be increased by sub-classifying them and reduced by grouping some of them together.

TABLE 2

| Priority Nos. | Real-Time Data Providing | Error Sensitivity | Allowable Delay | Types of Services | Examples of Services Provided |
|---|---|---|---|---|---|
| Priority 1 | ○ | ○ | ○ | High Level Control | Signaling |
| Priority 2 | ○ | □ | ○ | Conversational AV | VoIP |
| Priority 3 | ○ | □ | □ | Conversational AV | Video-Conferencing |
| Priority 4 | ○ | x | ○ | Streaming | AV Streaming |
| Priority 5 | ○ | x | □ | Streaming | AV Streaming |
| Priority 6 | ○ | x | x | Streaming | AV Streaming |
| Priority 7 | □ | ○ | ○ | Interactive Communication | Electronic Commerce |

TABLE 2-continued

| Priority Nos. | Real-Time Data Providing | Error Sensitivity | Allowable Delay | Types of Services | Examples of Services Provided |
|---|---|---|---|---|---|
| Priority 8 | □ | ○ | □ | Interactive Communication | Web Browsing |
| Priority 9 | □ | ○ | x | Interactive Communication | Telnet |
| Priority 10 | x | ○ | ○ | Default Best Effort | Default Data Service |
| Priority 11 | x | ○ | □ | Background | E-mail, Download |
| Priority 12 | x | ○ | x | Low Level Best Effort | Signaling |

In Table 2, the significance of each of the service traffic characteristics is classified as high (○), middle (□), and low (x), and the service traffic characteristics are numbered in terms of "real-time data providing," "error sensitivity," and "allowable delay," based on their significance. Therefore, the high level control signaling is determined to have a first priority since the "real-time data providing," the "error sensitivity," and the "allowable delay" are all significant to the high level control signaling. The VoIP service is determined to have a second priority since the error sensitivity is less significant to the VoIP service than the high level control signaling. Likewise, each of the service traffic characteristics is classified as twelve priorities.

FIG. 3A is a layout diagram illustrating a data packet including a first priority information field. Referring to FIG. 3A, the first priority information field included in the data packet is mapped to a PLC priority information field (a second priority information field) as illustrated in Table 1, and the PLC priority information field is attached to a frame header (MAC header) as illustrated in FIG. 3B. FIG. 3B is a layout diagram illustrating the MAC header combined with the PLC priority information field. The MAC header is attached to a data frame body to generate a data frame as illustrated in FIG. 3C. Additional fields such as a padding field BPAD, a CRC field FCS, etc., can be attached to the data frame. Referring to FIG. 4, data frames are transmitted to a data frame buffer and stored therein. In detail, transmission priorities of data frames are determined based on the PLC priority information field included in each of the data frames so that the data frames are sequentially transmitted to the lower layer. Since frame 1 is a first priority, frame 2 is a fifth priority, and frame 3 is an eighth priority, data frames are transmitted in the order of the frames 1, 2, and 3.

Figure 5:
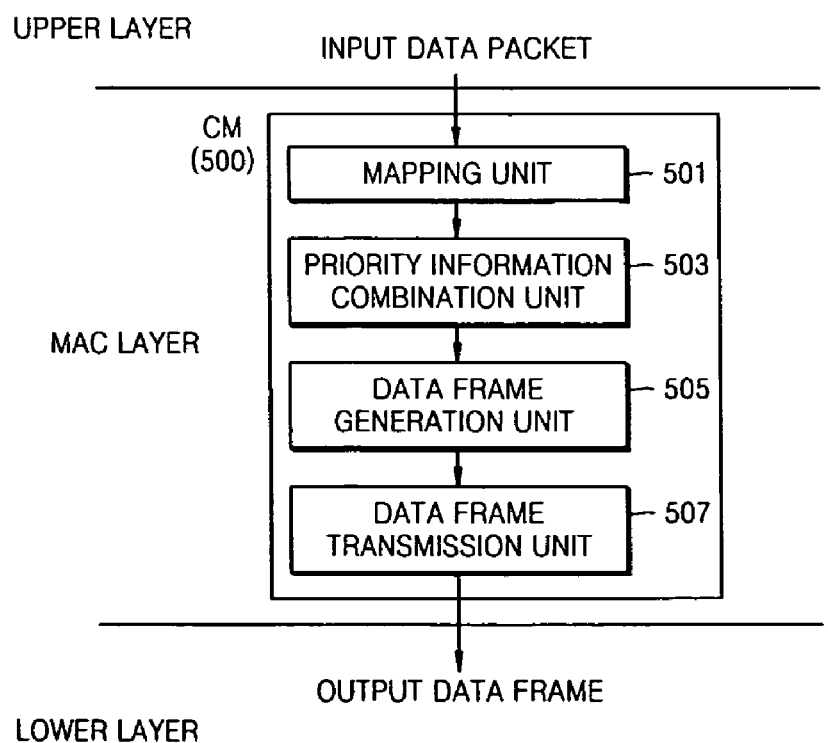
FIG. 5 is a block diagram illustrating an apparatus to sequentially transmit data based on transmission priority determined according to service traffic characteristics.

FIG. 5 is a block diagram illustrating an apparatus to sequentially transmit data based on transmission priority determined according to service traffic characteristics. Referring to FIG. 5, the apparatus to sequentially transmit data is referred to as a connection management (CM) apparatus 500, and comprises at least one processor including a mapping unit 501, a priority information combination unit 503, a data frame generation unit 505, and a data frame transmission unit 507. If a data packet is input to the CM apparatus 500 of a MAC layer from an upper layer, the mapping unit 501 maps a priority information field of the data packet to a PLC priority information field as illustrated in FIGS. 2-5. The priority information combination unit 503 attaches the mapped PLC priority information field to a frame header (MAC header). The data frame generation unit 505 attaches the frame header and other fields to a data frame body to generate a data frame. The generated data frame is stored in a data frame buffer of the data frame transmission unit 507. The transmission priority of each data frame is determined based on the PLC priority information field included in the data packet so that data frames are transmitted to a lower layer based on the transmission priority.

Figure 6:
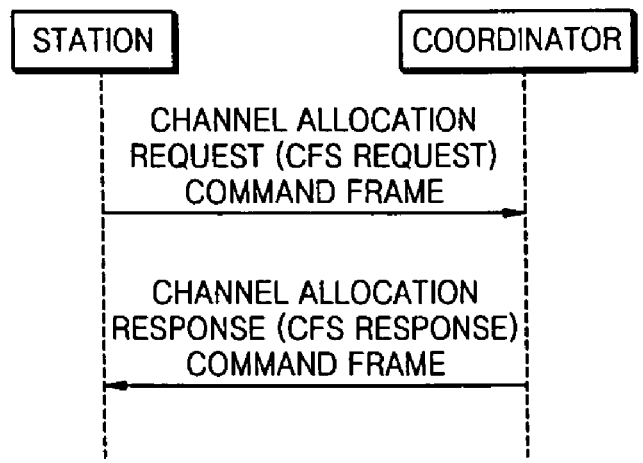
FIG. 6 is a layout diagram illustrating a channel allocation request/response made between a coordinator and a station.

FIG. 6 is a layout diagram illustrating a channel allocation request/response made between a coordinator and a station. Referring to FIG. 6, if the station transmits a CFS request command frame to the coordinator, the coordinator generates a CFS response command frame based on PLC priority information included in the CFS request command frame and transmits the CFS response command frame to the station.

Figure 7:
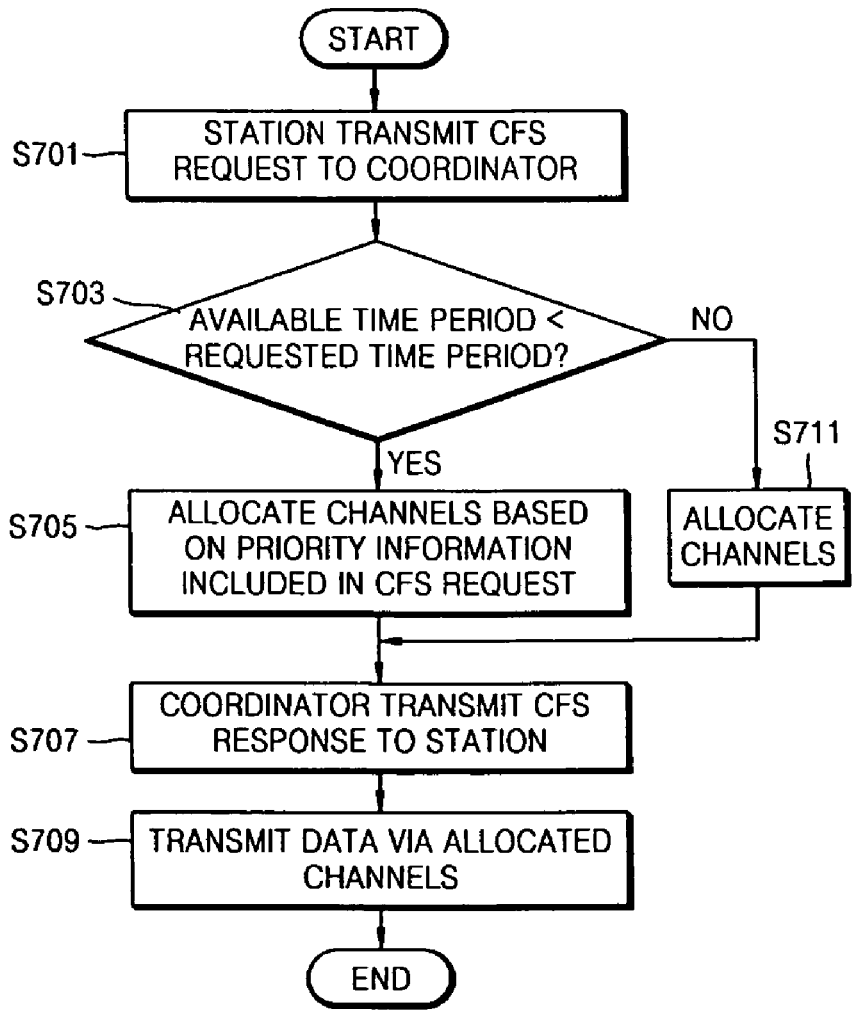
FIG. 7 is a flowchart illustrating a method of allocating channels based on priority determined according to service traffic characteristics via a channel request/response made between a coordinator and stations.

FIG. 7 is a flowchart illustrating a method of allocating channels based on priority determined according to service traffic characteristics via a channel request/response made between a coordinator and a plurality of stations. Referring to FIG. 7, if the stations transmit a channel allocation request to the coordinator (Operation S701), the coordinator compares a channel available time period and a transmission time period requested by the stations (Operation S703). If the transmission time period requested by the stations is longer than the channel available time period, the coordinator performs the channel allocation on each of the stations based on PLC priority information included in the channel allocation request (Operation S705), and transmits a channel allocation response including information on channel allocation success or failure to the stations (Operation S707). The stations that receive the channel allocation response transmit data via the allocated channels (Operation S709). If the channel available time period is longer than the transmission time period requested by the stations, since it is not necessary to allocate channels based on the priority, the coordinator allocates the channel on each of the stations (Operation S711), and transmits the channel allocation response including information on a channel allocation success to the stations (Operation S707). The stations that receive the channel allocation response transmit the data via the allocated channels (Operation S709).

Figure 8A:
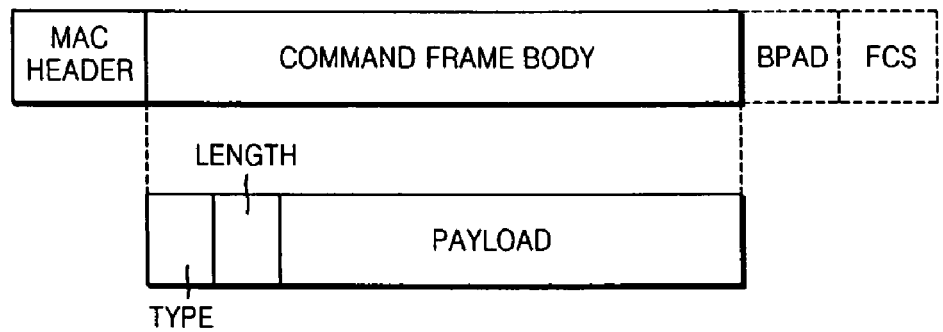
FIGS. 8A through 8C are views illustrating the specific format of a CFS request command frame and a CFS response command frame as illustrated in FIG. 6.
Figure 8B:
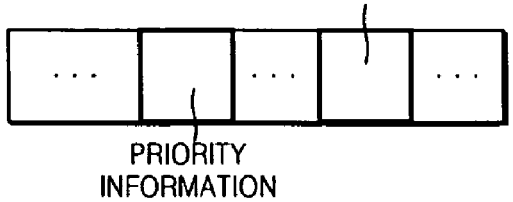
Figure 8C:
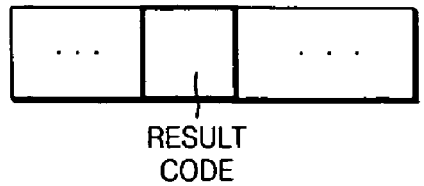

FIGS. 8A through 8C are diagrams illustrating the specific format of a channel allocation request (CFS request) command frame and a channel allocation response (CFS response) command frame as illustrated in FIG. 6. The CFS request command frame transmitted from a station to a coordinator includes a CFS request payload, as illustrated in FIG. 8B, in a payload area of the CFS request command frame. The CFS response command frame transmitted from the coordinator to the station includes a CFS request payload illustrated in FIG. 8C in a payload area of the CFS response command frame. A payload type field to determine whether a payload is a CFS request payload or a CFS response payload and a length field to indicate the size of a payload are combined together to generate a command frame body. A frame header (a MAC header), a padding field BPAD, a CRC field FCS, etc., are combined with the command frame body to generate the CFS request/response command frames as illustrated in FIG. 8A. These CFS request/response command frames are transmitted between the coordinator and the station.

The CFS request payload includes a PLC priority information field in which PLC priority information illustrated in Tables 1 and 2 is written. The coordinator allocates channels based on the PLC priority information. The CFS request payload includes a request time period information field of the station. The coordinator compares a request time period of the station and a channel available time period, and determines whether to allocate channels using the PLC priority information based on the comparison result. The CFS response payload in which a channel allocation result code is written informs the station of channel allocation success or failure. If the channel allocation result code is 1, it can be set as the channel allocation success, and if the channel allocation result code is 0, it can be set as the channel allocation failure.

Figure 9A:
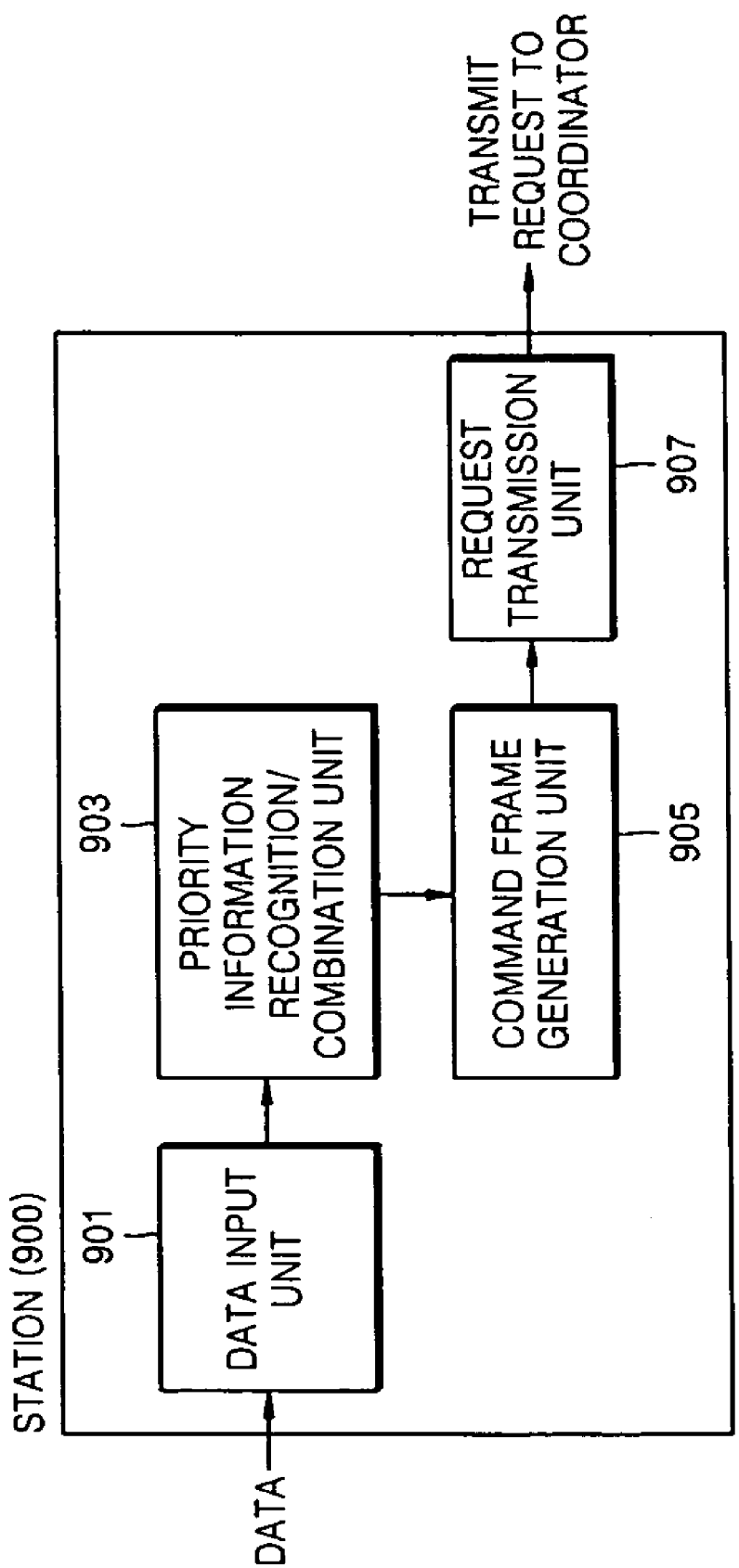
FIG. 9A is a block diagram illustrating a station that requests channel allocation using priority determined according to service traffic characteristics.

FIG. 9A is a block diagram illustrating a station 900 that requests a channel allocation using priority determined according to service traffic characteristics. Referring to FIG. 9A, the station 900 comprises a data input unit 901, a priority information recognition/combination unit 903, a command frame generation unit 905, and a request transmission unit 907. Data is input to the data input unit 901 and transmitted to the priority information recognition/combination unit 903. The priority information recognition/combination unit 903 recognizes priority information included in the data, and, if the priority information is not included in the data or if the priority information other than PLC priority information is included in the data, attaches the PLC priority information generated based on the service traffic characteristics to the data. The PLC priority information is mapped based on the service traffic characteristics as illustrated in Tables 1 and 2. The data including the PLC priority information is transmitted to the command frame generation unit 905. The command frame generation unit 905 attaches the data to a frame heater, a padding field, a CRC field, etc., generates a CFS request command frame illustrated in FIG. 8A, and transmits the CFS request command frame to a coordinator via the request transmission unit 907.

Figure 9B:
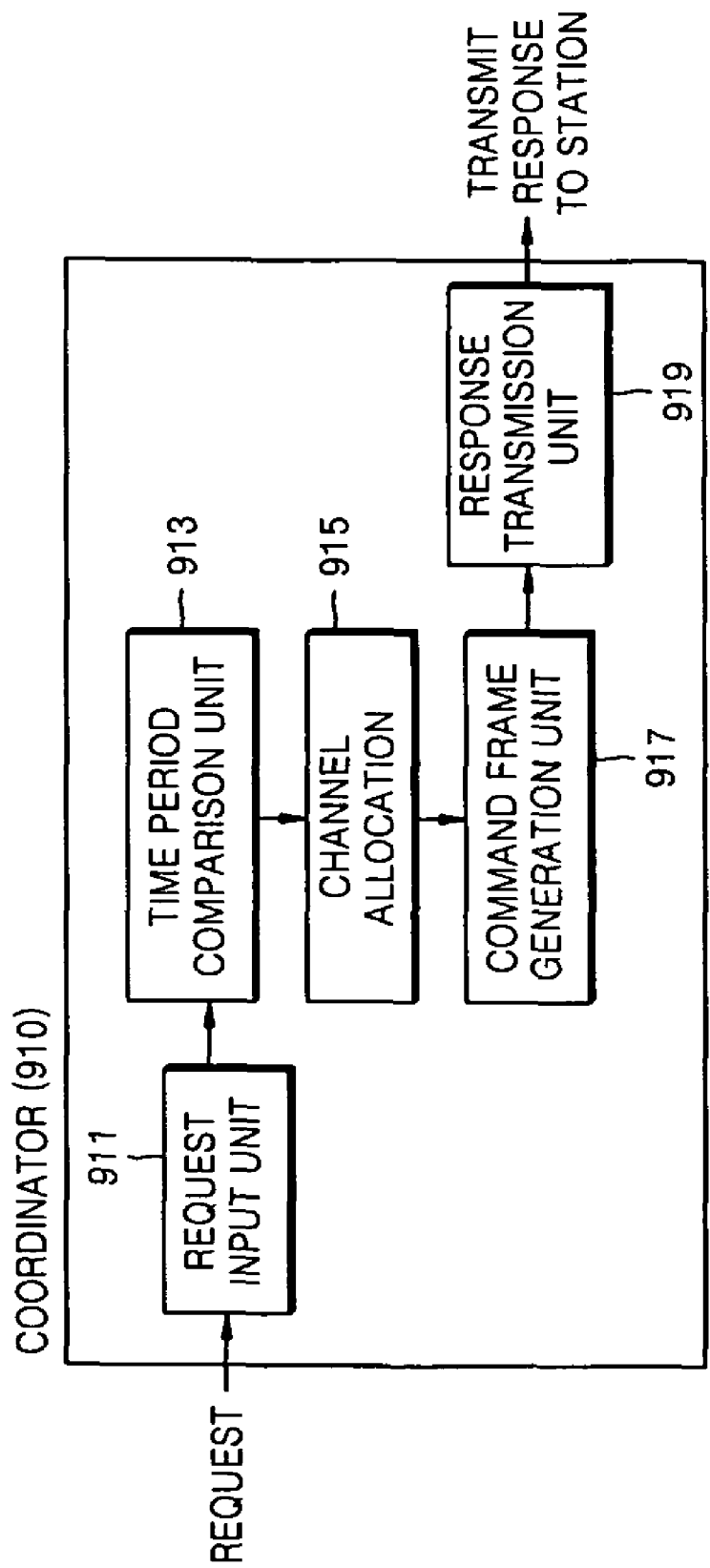
FIG. 9B is a block diagram illustrating a coordinator that responds to channel allocation using the priority determined according to service traffic characteristics.

FIG. 9B is a block diagram illustrating a coordinator 910 that responds to the CFS request using the priority determined according to the service traffic characteristics. Referring to FIG. 9B, the coordinator 910 comprises a request input unit 911, a time period comparison unit 913, a channel allocation unit 915, a command frame generation unit 917, and a response transmission unit 919. The channel allocation request command frame transmitted from the station 900 is input into the request input unit 911 and transmitted to the time period comparison unit 913. The time period comparison unit 913 compares a channel available time period and a time period requested by the station 900 and determines whether to use PLC priority information to allocate the channel. The channel allocation request command frame includes information from the time period requested by the station 900. If the time period requested by the station 900 is longer than the channel available time period, the channel allocation unit 915 allocates channels on each piece of data using the priority according to the PLC priority information included in the channel allocation request command frame. If the channel available time period is longer than the time period requested by the station 900, since it is not necessary to transmit data based on the priority information, the channel allocation unit 915 allocates channels in a general manner. If the time period comparison unit 913 and the channel allocation unit 915 determine a channel allocation priority and whether the channel allocation is succeeded or failed, the command frame generation unit 917 combines a channel allocation response payload with a frame header, a padding field, a CRC field, etc., generates a channel allocation response command frame as illustrated in FIG. 8A, and transmits the channel allocation response command frame to the station 900 via the response transmission unit 919.

According to the present general inventive concept, service traffic provided through a PLC network is classified, thereby providing differentiated QoS according to service traffic characteristics. For example, since whether to provide data in real-time is significant to an AV streaming service, the AV streaming service is classified to meet the characteristic thereof so that transmission of data and channel allocation priority are determined according to the classification of the AV streaming service.

Also, services are sub-classified in more than QoS levels of services provided by an upper layer, thereby providing sub-differentiated QoS according to service characteristics.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A data transmission method for a data transmission apparatus, comprising:
inputting data including first transmission priority information;
mapping the first transmission priority information to second transmission priority information according to classified and compared service traffic characteristics of the input data, wherein the service traffic characteristics comprise at least one of whether to provide data in real-time, error sensitivity, and allowable delay; and
transmitting the data based on the second transmission priority information.

2. A data transmission apparatus, comprising:
a priority information mapping unit of a processor to receive data including first transmission priority information and to map the first transmission priority information to second transmission priority information according to ranked service traffic characteristics of the received data, wherein the service traffic characteristics comprise at least one of whether to provide data in real-time, error sensitivity, and allowable delay; and
a data transmission unit to transmit the data based on the second transmission priority information.

3. A non-transitory computer readable recording medium having embodied thereon a computer program to:
  input data including first transmission priority information;
  map the first transmission priority information to second transmission priority information according to classified and compared service traffic characteristics of the input data, wherein the service traffic characteristics comprise at least one of whether to provide data in real-time, error sensitivity, and allowable delay; and
  transmit the data based on the second transmission priority information.

4. An apparatus to request a channel allocation using priority determined according to service traffic characteristics, the apparatus comprising:
  a processor including a priority information recognition/combination unit to receive data, recognize priority information included in the received data, and attach power line communication (PLC) priority information generated based on the service traffic characteristics of the received data to the received data if the priority information is not included in the received data or if the priority information other than the PLC priority information is included in the received data, wherein the service traffic characteristics comprise at least one of whether to provide data in real-time, error sensitivity, and allowable delay; and
  a command frame generation unit to generate a channel allocation request command frame, and transmit the channel allocation request command frame to a coordinator.

5. The apparatus of claim 4, wherein the coordinator comprises:
  a time period comparison unit to compare a channel available time period and a time requested by the station and then determine whether to use PLC priority information to allocate the channel.

6. The apparatus of claim 5, wherein if the time period requested by the station is longer than the channel available time period, allocating channels on each piece of data using a priority according to the PLC priority information.

7. An apparatus including a processor to classify input data according to service traffic characteristics of the input data and to sequentially transmit data based on a transmission priority determined according to service traffic characteristics in a power line communication (PLC) network, comprising:
  a mapping unit to map a priority information field determined according to service traffic characteristics of a data packet to a PLC priority information field, wherein the service traffic characteristics comprise at least one of whether to provide data in real-time error, sensitivity, and allowable delay;
  a priority information combination unit to attach the mapped PLC priority information field to a frame header;
  a data frame generation unit to attach the frame header and other fields to a data frame body to generate a data frame; and
  a data frame transmission unit to transmit the generated data frame.

8. The apparatus of claim 7, wherein the generated data frame is stored in a data frame buffer of the data frame transmission unit prior to being transmitted.

9. The apparatus of claim 7, wherein the transmission priority of the generated data frame is determined based on the PLC priority information field prior to transmitting the generated data frame to a lower layer based on the transmission priority.

10. The apparatus of claim 7, wherein the mapping occurs when the data packet is input to the apparatus from an upper layer to a media access control (MAC) layer.

11. A method of sequentially transmitting data based on a transmission priority determined according to service traffic characteristics in a power line communication PLC network, comprising;
  inputting a data packet including service traffic characteristics;
  mapping a priority information field determined according to service traffic characteristics of the data packet to a PLC priority information field, wherein the service traffic characteristics comprise at least one of whether to provide data in real-time, error sensitivity, and allowable delay;
  attaching the mapped PLC priority information field to a frame header;
  generating a data frame by attaching the frame header and other fields to a data frame body; and
  transmitting the generated data frame.

12. The method of claim 11, further comprising storing the generated data frame prior to transmitting, in order to determine the transmission priority of the generated data frame based on the PLC priority information field.

13. A data transmission apparatus including a processor, comprising:
  a data input unit to receive service traffic data and to transmit priority information to a priority information recognition/combination unit;
  a priority information recognition/combination unit to receive priority information included in the data and attach PLC priority information generated based on service traffic characteristics of the received data, wherein the service traffic characteristics comprise at least one of whether to provide data in real-time, error sensitivity, and allowable delay; and
  a command frame generation unit to receive the PLC priority information and generate a channel allocation command frame including a channel allocation payload in a payload area of the channel avocation command frame.

14. The apparatus of claim 13, wherein the channel allocation payload is a channel allocation request payload transmitted from a station to a coordinator.

15. The apparatus of claim 13, wherein the channel allocation payload is a channel allocation response payload transmitted from a coordinator to a station.

16. The apparatus of claim 13, wherein the channel allocation payload includes a PLC priority information field in which PLC priority information is written.

17. A method of transmitting data in a PLC network, the method comprising:
  classifying and comparing service traffic characteristics of input data to determine first transmission priority information of the data, wherein the service traffic characteristics comprise at least one of whether to provide data in real-time, error sensitivity, and allowable delay;
  mapping the first transmission priority of the data to second PLC priority information to form data frames having different transmission priorities; and
  sequentially transmitting the data frames in a PLC network based on the second PLC priority information.

18. The method of claim 17, wherein the data includes service traffic to be transmitted.

19. A method of determining data transmission priorities according to service traffic characteristics in a PLC network, the method comprising:

inputting service traffic that is prioritized based on service traffic characteristics of the service traffic into a first priority information sequence, wherein the service traffic characteristics comprise at least one of whether to provide data in real-time, error sensitivity, and allowable delay;

mapping the first priority information sequence to a second priority information sequence in a PLC apparatus;

forming data frames including the first priority information and the second priority information; and transmitting the data frames within the PLC network.

* * * * *